No. 867,806. PATENTED OCT. 8, 1907.
R. DITCHFIELD.
SPRAYING APPARATUS.
APPLICATION FILED OCT. 30, 1906.

WITNESSES:

INVENTOR.
Robert Ditchfield.
BY
ATTORNEYS

UNITED STATES PATENT OFFICE.

ROBERT DITCHFIELD, OF WOODSTOCK, ONTARIO, CANADA.

SPRAYING APPARATUS.

No. 867,806.      Specification of Letters Patent.      Patented Oct. 8, 1907.

Application filed October 30, 1906. Serial No. 341,304.

*To all whom it may concern:*

Be it known that I, ROBERT DITCHFIELD, of the city of Woodstock, in the Province of Ontario, Canada, have invented certain new and useful Improvements in Spraying Apparatus, of which the following is a specification.

My object is to devise simple means for spraying lawns and gardens, and my invention consists essentially of apparatus adapted for connection with an ordinary hose nozzle whereby the water from the latter is effectively turned into a spray without reducing the flow through the nozzle, or creating undue pressure in the hose, substantially as hereinafter more specifically described, and then definitely claimed.

Figure 1:
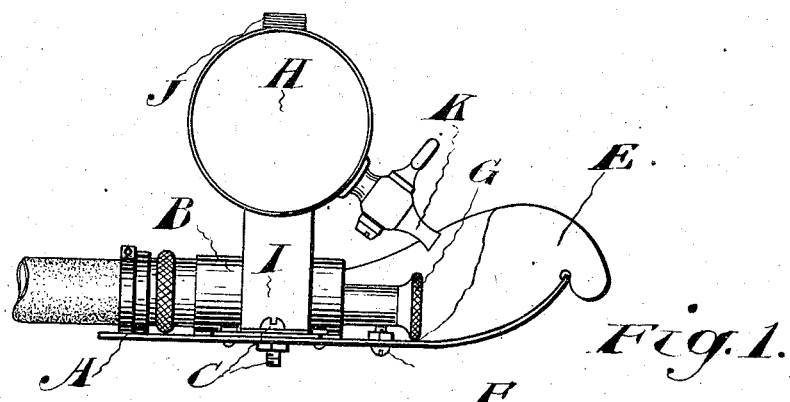
Figure 2:
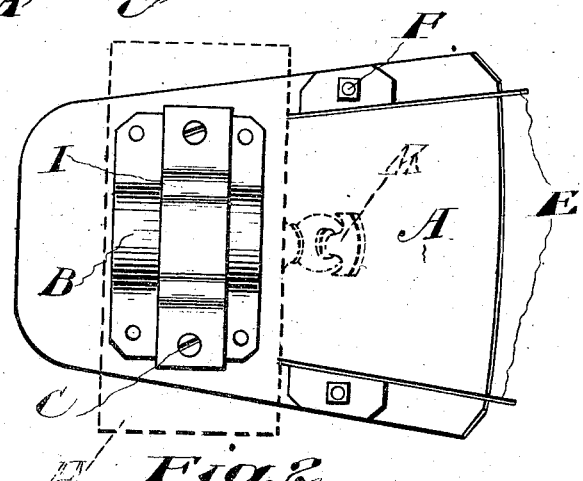
Figure 3:
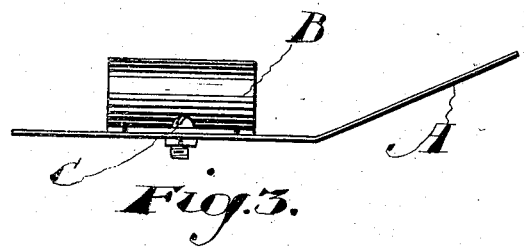

Figure 1 is a side elevation of my improved spraying apparatus. Fig. 2 is a plan view of the same. Fig. 3 is a view in side elevation showing a modified form of the deflecting plate, the reservoir and wings being removed.

In the drawings like letters of reference indicate corresponding parts in the different figures.

A is a plate of sheet metal, to which is secured at one end an arch-shaped strap B, adapted to receive the nozzle of the garden hose. As this strap is connected by screw bolts C to the plate it is readily adjusted to adapt it to any variations in the size of the nozzles on which it may be employed.

I aim to produce the spraying action by causing the stream of water from the nozzle to impinge on a plate at an angle to the surface thereof so that the water leaves the plate in a spray, and in a forward direction. It is necessary therefore that the nozzle and the plate be inclined relative to one another. This is preferably accomplished by inclining upward the front part of the plate A, preferably in a curve as shown. I find that with the plate curved as illustrated the water from the nozzle is dashed into spray, and is comparatively evenly distributed over the ground in front of the plate, from a point close to the plate, to the limit to which the water is thrown.

In Fig. 3 the front part of the plate A is shown inclined upwardly as a plane instead of with the curve shown in Fig. 1. Such a construction answers the purpose of my invention practically as effectively as the curved form.

Particularly in watering narrow strips of grass, or in working close to fences or buildings, it is necessary to restrict or control the lateral spread of the spray. For this purpose I pivot on the plate A, substantially at right angles to its surface, the wings E. The pivot bolts F of the wings are preferably located adjacent to the end of the nozzle G. By means of these bolts the wings may be clamped at any angle desired, and the width and lateral direction of the normally fan-shaped spray regulated and controlled as may be desired.

In gardening operations it is often necessary to spray plants and shrubs with chemical insecticides and fungicides and I therefore have provided my sprayer with means for mingling with the spray any suitable chemical solution for this purpose.

Suitably supported above the plate A is a small tank or reservoir H. This may be supported in any desired manner, either permanently or in such a manner that it may be readily and quickly detached. I show it secured by the screw bolts C which pass through the supporting legs I, secured to the under side of the reservoir. The reservoir is thus easily removable at any time.

The top of the tank is provided with an inlet opening provided with a screw cap J.

Extending from the under side of the reservoir is a discharge spout K, preferably formed as a small stop whereby the flow of liquid from the tank is regulated. This spout, it will be seen, is arranged to discharge directly in front of the aperture of the nozzle G. A concentrated chemical solution is placed in the reservoir and the spout adjusted to deliver a proper proportion of the concentrated solution to give, with the water issuing from the nozzle, a solution of the proper strength for the purpose intended. The water and the chemical solution mingle together and striking the plate are thoroughly intermixed, and every part of the resulting spray will be found to bear a proper proportion of the chemical solution.

For spraying lawns the device, with the connected hose, lies upon the ground and the spray is directed in any desired direction by turning the sprayer, or by adjusting the wings thereon.

When desired for spraying plants or shrubs it may be held in the hand and turned to direct the spray as required.

My device has many advantages. It is exceedingly simple and very convenient and effective in use, and, at a very small cost, it provides means for spraying shrubs and plants quite as effectively as it can be done with the larger and more expensive outfits ordinarily employed.

One important advantage of my device is that the outflow of the nozzle is not in any way reduced as is necessarily the case in the ordinary spray nozzle in which the aperture of the nozzle is restricted in such a manner as to break up the ordinary solid stream. Thus with my device a lawn may be watered more quickly and effectively than with ordinary spray nozzles, and it will be found that the hose employed will last longer than when an ordinary spray nozzle is used since restriction of the nozzle to produce a spray necessarily increases the pressure in the hose, which frequently leads to a premature bursting of the latter.

What I claim as my invention is:

1. In spraying apparatus the combination of a plate; a nozzle; the nozzle and the plate being so arranged and connected that the water from the nozzle impinges on part of the plate; and side wings pivotally secured substantially perpendicular to the surface of the plate, substantially as described.

2. In spraying apparatus the combination of a plate; a nozzle; the nozzle and the plate being so arranged and connected that the water from the nozzle impinges on part of the plate; and side wings each pivoted on a single pivot bolt located adjacent to the end of the nozzle, substantially as described.

Toronto, Ont., 22nd October, 1906.

ROBERT DITCHFIELD.

Signed in the presence of—
J. EDW. MAYBEE.
EDGAR M. SHEPPARD.